United States Patent [19]

Hesse et al.

[11] Patent Number: 5,047,455

[45] Date of Patent: Sep. 10, 1991

[54] THICKENED MOLDING COMPOSITIONS

[75] Inventors: Anton Hesse, Weinheim; Jan Holoch, Leimen; Roland Peter, Mutterstadt, all of Fed. Rep. of Germany

[73] Assignee: BASF Aktiengesellschaft, Ludwigshafen, Fed. Rep. of Germany

[21] Appl. No.: 244,395

[22] Filed: Sep. 15, 1988

[30] Foreign Application Priority Data

Sep. 16, 1987 [DE] Fed. Rep. of Germany ....... 3731067

[51] Int. Cl.$^5$ ............................................. C08L 67/06
[52] U.S. Cl. ................................... 523/508; 524/507; 524/539; 524/853; 524/212; 524/213; 524/215; 524/216; 525/28
[58] Field of Search ......................... 523/508; 525/28; 524/507, 539, 853, 212, 213, 215, 216

[56] References Cited

U.S. PATENT DOCUMENTS

| | | | |
|---|---|---|---|
| 2,760,953 | 8/1956 | Seeger | 260/75 |
| 3,047,530 | 7/1962 | Nischk et al. | 260/45.4 |
| 4,073,828 | 2/1978 | Ferrarini et al. | 525/28 |
| 4,296,020 | 10/1981 | Magrans, Jr. | 525/28 |
| 4,413,072 | 11/1983 | Hess et al. | 525/28 |
| 4,584,325 | 4/1986 | Smith | 521/99 |
| 4,880,872 | 11/1989 | Thomas | 525/28 |

FOREIGN PATENT DOCUMENTS 1015340 12/1965 United Kingdom .

*Primary Examiner*—Paul R. Michl
*Assistant Examiner*—Karen A. Hellender
*Attorney, Agent, or Firm*—Oblon, Spivak, McClelland, Maier & Neustadt

[57] ABSTRACT

A thickened, uncrosslinked molding composition which has a long shelf life and can be cured above 50° C. comprises a liquid reactive system, a thickener, a polymerization initiator and conventional additives. The thickener is a combination of a primary aromatic amine and an isocyanate. The molding compositions, which are, in particular, SMCs or BMCs, can be processed into moldings by compression molding, injection molding or transfer molding and subsequent curing.

19 Claims, No Drawings

THICKENED MOLDING COMPOSITIONS

The invention relates to a thickened, uncrosslinked molding composition of long shelf life which can be cured by means of free radicals at above 50° C.

Thickened, curable molding compositions are semi-finished products which have a long shelf life and can be molded and thereafter can be cured to form moldings. Examples are sheet molding compounds (SMCs) and bulk molding compounds (BMCs) which contain unsaturated polyesters and monomers (UP resins) and also reinforcing fibers and fillers. Their production and processing is described, for example, in the monogram by P. F. Bruins, "Unsaturated Polyester Technology", Gordon and Breach Science Publishers, 1976, pages 211 to 238. The customary thickening of SMCs using alkaline earth metal oxides or hydroxides is based on salt formation with the polyester carboxyl groups. Liquid reactive systems which do not contain acid groups are therefore not employed in SMC technology. Numerous UP resins, in particular those which are flexible and those having low molecular weight, thicken only inadequately or not at all, in spite of containing carboxyl groups. For this reason, only a small number of liquid reactive systems can be made available to SMC technology with the aid of this thickening process. It is also disadvantageous that carboxylate and metal ions present in the cured molding material contribute to increased water absorption as a consequence of salt formation.

The thickening of UP resins using polyisocyanates is described in the technical and patent literature (e.g. GB 1,141,382, GB 1,272,984, U.S. Pat. No. 3,824,201 and EP 16,248). However, this process has not become established in industry since it is obviously not possible to produce tack-free products of adequate shelf life in this way. Gelling occurs after only a short time, which means that the semi-finished products can no longer be processed in an optimum manner.

It is an object of the present invention to develop a thickener which is effective, very generally, in liquid reactive systems which can be polymerized by means of free radicals, i.e. not only in those which contain carboxyl groups, and using which tack-free, uncrosslinked molding compositions of long shelf life with which optimum impregnation of reinforcing fibers is possible can be produced and which do not have the disadvantages of customary SMCs containing alkaline earth metal ions.

We have found that this object is achieved, according to the invention, if the thickener used is a combination of an isocyanate with an aminobenzoic acid derivative. In this system, the preferential reaction is that of an isocyanate group with an amine group to form a urea structure. It is assumed that the microcrystalline phase formed during this reaction slowly precipitates out at low temperatures and forms a thermoreversible, physical network which results in the desired increase in viscosity of the system. The rate and extent of the viscosity increase can be specifically modified by the concentration of the amine in the system and by the isocyanate:amine group ratio. If the system contains further groups which react with isocyanates, e.g. hydroxyl and carboxyl groups, these may react with excess isocyanate. At room temperature, this reaction proceeds more slowly than the urea formation, and it may therefore be hours, in some case days, before thickening is complete. This secondary reaction caused hydroxyl- or carboxyl-containing oligomers of polymers present in the liquid reactive system to be bound to the polyurea. An excessively large excess of isocyanate groups should be avoided since crosslinking of the oligomers or polymers via urethane bridges otherwise takes place and the molding composition becomes insoluble.

The formation of urea from a polyisocyanate and an aromatic amine is known per se. It is utilized in the production of polyurethane elastomers. Thus, for example, U.S. Pat. No. 2,760,953 describes a moldable product of the reaction of a polyester, a diisocyanate and a diamine, which has a long shelf life and can be crosslinked to form an elastomer by adding further diisocyanate.

Crosslinking effected by excess isocyanate also takes place in the process, described in DE-B 1,000,998 (U.S. application No. 3,047,530), for the production of highly crosslinked plastics. In this process, products of the reaction of an unsaturated polyester polyol with a diisocyanate are dissolved in a vinyl monomer, and a diamine and a peroxide initiator are added. On increasing the temperature simultaneous crosslinking occurs via the formation of urethane bridges and free-radical polymerization. Intermediate formation of a thickened molding composition is not described.

The process of DE-B-1,156,976 (GB-A 1,015,340) for the production of plastics also uses a large excess of isocyanate. The product of a saturated or unsaturated polyester polyol with excess diisocyanate is mixed with a crosslinking agent, which may also be, inter alia, a diamine, and if desired with a vinyl monomer and a free-radical former. During curing, crosslinking takes place with the excess isocyanate groups trimerizing to form an isocyanurate ring. If monomers and free-radical formers are present, free-radical polymerization may proceed in parallel thereto. Thickening of liquid reactive systems to form semi-finished products for the purpose of better processability by molding is not mentioned at all in DE-B 1,156,976. The reactive systems described in the examples are all solid, and thickening is thus superfluous.

DE-A 2,715,294 (U.S. Pat. No. 4,073,828) and EP-A 28,470 (U.S. Pat. No. 4,296,020) describe the thickening of unsaturated polyester resins by combination of an isocyanate with a polyamine, preferably an aliphatic polyamine. It has been shown that, using the polyamines mentioned therein, either no adequate increase in viscosity is achieved, i.e. tack-free products are not obtained, or that the thickening proceeds much too quickly, even at room temperature, and impregnation of reinforcing fibers is no longer possible.

Finally, U.S. Pat. No. 4,584,325 describes a two-component system. Liquid mixtures of unsaturated polyesters, monomers, an aromatic diamine and a cobalt accelerator on the one hand and of an isocyanate with a peroxide initiator on the other hand are combined. The cold-curing, cobalt-accelerated system then cures immediately without production of a thickened semi-finished product of long shelf life.

The invention relates to a thickened, uncrosslinked molding composition which has a long shelf life at 23° C. and can be cured at above 50° C. and contains A a liquid reactive system which can be polymerized by means of free radicals, B 1 to 80% by weight, preferably 1 to 20% by weight, based on A, of an isocyanate-containing thickener C 0.01 to 5% by weight, based on A, of a polymerization initiator which decomposes at above 50° C., and, if desired, D customary additives, where the thickener is a combination of B1 0.001 to 0.5 amine equivalent, based on 100 g of A+B1, of an aminobenzoic acid derivative, and B2 0.001 to 1.5 isocyanate equivalents, based on one equivalent of all the NCO-reactive groups present in the molding composition, of an isocyanate.

The following applies to the individual components of the molding composition:

A. Component A is a liquid reactive system which can be polymerized by means of free radicals. Liquid here means that the system is free-flowing. This is also the case in an emulsion of dispersion of a pulverulent solid in a liquid, in the present case, for example, a thermoplastic powder in a monomer. The viscosity of this liquid reactive system at 23° C. should preferably be below 100,000 mPa.s, in particular from 200 to 5,000 mPa.s, measured in accordance with DIN 53 015 or using a rotation viscosimeter.

In a particular embodiment, component A comprises exclusively monomers A1 which can be polymerized by means of free radicals.

Suitable monomers containing unsaturated CC bonds which can be polymerized by means of free radicals are: vinylbenzenes, e.g. styrene, α-methylstyrene, vinyltoluene, ethylvinylbenzene, 2-chlorostyrene, 2,5-dichlorostyrene, 4-tert.-butylstyrene and divinylbenzene, 2-vinylpyridine, vinylcarbazole and vinylimidazole, vinylamides, e.g. N-vinylpyrrolidone and N-vinylcaprolactam, vinylurethanes, allyl compounds, e.g. diallyl o-phthalate, diallyl isophthalate, diallyl terephthalate, diallyl fumarate, allyl benzoate, triallyl cyanurate, diethylene glycol bis-allylcarbonate, diallyl ether, N-allylamides and allyl ethers of phenols and allylphenols, esters of acrylic acid and methacrylic acid with monohydric to hexahydric aliphatic, cycloaliphatic or aromatic alcohols containing 1 to 30 carbon atoms, for example the esters with methanol, ethanol, n-butanol, tert.-butanol, 2-ethylhexanol, butane-1,4-diol, butenediol, hexane-1,6-diol, 1,2-propyl-ene glycol, ethylene glycol, trimethylolpropane, glycerol, pentaerythritol, cyclohexanol, hydrogenated bisphenol A, ethoxylated of propoxylated bisphenol A, tricyclodecenol, diethylene glycol, triethylene glycol, polyethylene glycol, dipropylene glycol, polytetrahydrofuran and glycidol, amides of acrylic acid and methacrylic acid, and acrylonitrile, methacrylonitrile and cyanoacrylates, esters and monoesters of maleic acid, fumaric acid, chloromaleic acid, itaconic acid, mesaconic acid and methyleneglutaric acid with the alcohols mentioned in the case of the acrylates and methacrylates, maleic monoamides which can be prepared under mild conditions from maleic anhydride and aliphatic or aromatic amines (secondary and primary), and also the aromatic maleimides, containing 1 to 3 maleimide units per molecule, which are accessible by cyclizing the monoamides, vinyl esters, e.g. vinyl acetate, vinyl propionate, vinyl butyrate, vinyl 2-ethylhexanoate, vinyl stearate and vinyl benzoate, vinyl ethers, vinyl ketones, and monomers containing CC triple bonds (acetylene derivatives).

However, component A may also be a mixture of 5% by weight or more, preferably more than 20% by weight, of the monomer A1 with up to 95% by weight, preferably less than 80% by weight, of an oligomer or polymer A2.

A2 may in this case be saturated or unsaturated, may be dissolved in the monomer or homogeneously mixed therewith, or alternatively emulsified or dispersed in the monomer.

Unsaturated polymers or oligomers are, for example, unsaturated polyesters, vinyl esters, vinyl ester urethanes, allylated prepolymers, bismaleimide resins and hydrocarbon resins. They can be copolymerized with the monomer A1 during curing of the molding composition.

Saturated polymers or oligomers are, for example, saturated polyesters, polyester polyols, polyether polyols, epoxy resins, thermoplastics or elastomers. They are introduced into the molding material as a disperse phase during curing. In some cases, an interpenetrating network can form if the oligomer is itself thermocrosslinkable.

Unsaturated polyesters

Suitable unsaturated polyesters (UP) are the customary products of the condensation of polybasic, in particular dibasic, carboxylic acids and their esterifiable derivatives, in particular their anhydrides, and polyhydric, in particular dihydric, alcohols, which may also contain additional radicals of monobasic carboxylic acids, monohydric alcohols or hydroxycarboxylic acids, where at least some of the radicals must contain ethylenically unsaturated copolymerizable groups. Suitable polyhydric, in particular dihydric, saturated or unsaturated alcohols are the customary alkanediols and oxaalkanediols, in particular those which contain acyclic groups, cyclic groups or both types of groups, e.g. ethylene glycol, 1,2-propylene glycol, propane-1,3-diol, 1,3-butylene glycol, butane-1,4-diol, hexane-1,6-diol, 2,2-dimethylpropane-1,3-diol, diethylene glycol, triethylene glycol, polyethylene glycol, cyclohexane-1,2-diol, 2,2-bis-(p-hydroxycyclohexyl)propane, trimethylolpropane monoallyl ether, butane-1,4-diol or dipropylene glycol.

It is furthermore possible for monohydric, trihydric or polyhydric alcohols, e.g. ethylhexanol, fatty alcohols, benzyl alcohols, 1,2-di-(allyloxy)propan-3-ol, glycerol, pentaerythritol or trimethylolpropane, to be present in minor amounts. The polyhydric, in particular dihydric, alcohols are generally reacted in stoichiometric or approximately stoichiometric amounts with polybasic, in particular dibasic, carboxylic acids or the condensable derivatives thereof.

Suitable carboxylic acids or derivatives thereof are dibasic, olefinically unsaturated, preferably α,β-olefinically unsaturated carboxylic acids, e.g. maleic acid, fumaric acid, chloromaleic acid, itaconic acid, citraconic acid, methyleneglutaric acid and mesaconic acid, and the esters and preferably the anhydrides thereof. In addition, other dibasic, unsaturated and/or saturated, or aromatic carboxylic acids which have a modifying effect, e.g. succinic acid, glutaric acid, α-methylglutaric acid, adipic acid, sebacic acid, pimelic acid, phthalic anhydride, o-phthalic acid, isophthalic acid, terephthalic acid, dihydrophthalic acid, tetrahydrophthalic acid, tetrachlorophthalic acid, 3,6-endomethylene-1,2,3,6-tetrahydrophthalic acid, endomethylenetetrachlorophthalic acid or hexachloroendomethylenetetrahydrophthalic acid, furthermore monobasic, tribasic or polybasic carboxylic acids, e.g. ethylenehexanoic acid, fatty acids, methacrylic acid, propionic acid, benzoic acid, 1,2,4-benzenetricarboxylic acid or 1,2,4,5-benzenetetracarboxylic acid, may be co-condensed into the polyesters. Maleic acid, maleic anhydride and fumaric acid are preferably used.

The unsaturated dicarboxylic acid:saturated dicarboxylic acid molar ratio is preferably from 1:0 to 1:2.5.

Mixtures of unsaturated polyesters, including those which are only soluble in the vinyl monomers to a limited extent and crystallize readily, may likewise be advantageously employed. These unsaturated polyesters which crystallize readily may be synthesized, for example, from fumaric acid, adipic acid, terephthalic acid, ethylene glycol, butane-1,4-diol, hexane-1,6-diol and neopentylglycol.

Unsaturated polyesters, preferably containing terminal double bonds, are also suitable.

The unsaturated polyesters have acid numbers of from 0.5 to 100, preferably from 2 to 30, and mean molecular weights of from about 800 to 6,000, preferably from about 1,000 to 4,000.

The amorphous unsaturated polyesters which may be capable of crystallization are generally prepared from their starting components by a continuous or batchwise process by melt condensation or condensation under azeotropic conditions at from 150° to 220° C.

Unsaturated polyesters which have been modified by means of cyclopentene or cyclohexene groups are likewise suitable.

In order to introduce the cyclopentene and cyclohexene groups into the unsaturated polyesters, the latter are modified using dicyclopentadiene or derivatives or substitution products thereof, preferably using dicyclopentadiene, endomethylenetetrahydrophthalic acid, N-hydroxyalkyltetrahydrophthalimide or N-hydroxyalkylendomethylenetetrahydrophthalimide. These reactions are known. By starting from a diester having a high acid number or free maleic acid and working at from 120° to 140° C., essentially an addition reaction of dicyclopentadiene with the terminal carboxyl or hydroxyl groups takes plate. If a polyester having a low acid number is employed and the reaction is carried out at an elevated temperature, preferably above 170° C., the dicyclopentadiene cleaves into two molecules of cyclopentadiene, which undergoes an addition reaction with the ethylenedicarboxylate structures of the polyester and forms endomethylenetetrahydrophthalate structures. These structures can also be produced by using endomethylenetetrahydrophthalic acid or the anhydride thereof.

In a preferred embodiment, the modified unsaturated polyesters are subjected to end group closure using N-hydroxyalkyltetrahydrophthalimide or N-hydroxyalkylendomethylenetetrahydrophthalimide.

Vinyl esters

For the purposes of the invention, vinyl esters are products of the reaction of polyepoxides with unsaturated monocarboxylic acids, preferably methacrylic acid. These products are frequently dissolved in unsaturated monomers, preferably styrene. These resins are described, for example, in U.S. Pat. Nos. 3,066,112 and 3,179,623, where vinyl ester resins based on bisphenol A are preferably used. They have high toughness and good chemical resistance along with limited heat distortion resistance. In contrast, vinyl ester resins made from epoxy-novolak resins and (meth)acrylic acid, as described, for example, in U.S. Pat. No. 3,256,226, have higher distortion resistance, but lower toughness.

Characteristic of the vinyl ester resins is the group,

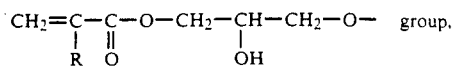

where R is H or CH$_3$.

The epoxy resins used for the preparation of the vinyl esters are derived from polyhydric phenols and alcohols. The epoxide equivalent weights can be from 60 to 2,000. The epoxy resins are synthesized by reacting a polyhydric phenol or alcohol with epichlorohydrin and subsequently dehydrochlorinating the product using sodium hydroxide solution. The precise preparation conditions and typical representatives of the epoxy resins are described, for example, in "Handbook of Epoxy Resins" by Henry Lee and Kris Neville, McGraw-Hill, 1967.

Preferred epoxy resins are glycidyl ethers based on bisphenol A having epoxide equivalent weights of from 140 to 1,000. A further suitable group of polyepoxides are those based on ring-hydrogenated bisphenol A and bisphenol F, 2,2-bis-(4-hydroxyclclohexyl)propane or bis-(4-hydroxycyclohexyl)methane, and epoxidized cycloolefins. In addition, polyglycidyl ethers of novolak resins are an important group of epoxy resins. These include the products of the condensation of phenol or cresol and an aldehyde such as formaldehyde or butyraldehyde, and products of the addition reaction of phenol or a substituted phenol with an olefin such as dicyclopentadiene, isoprene or norbornene. In addition, the preferred epoxy resins include those derived from alkylenepolyphenols, e.g. bis-(4-hydroxyphenyl)methane, 1,1,2,2-tetrakis-(4-hydroxyphenyl)ethane or 1,1,3-tris-(4-hydroxyphenyl)propane.

Specific examples of epoxy resins based on polyhydric aliphatic alcohols are polyglycidyl ethers of butane-1,4-diol, hexane-1,6-diol, trimethylolpropane and polyTHF.

For the purposes of the invention, unsaturated monocarboxylic acids are α,β-unsaturated carboxylic acids such as acrylic acid or methacrylic acid, and monoesters of unsaturated dicarboxylic acids. Methacrylic acid is particularly preferred. The reaction of an epoxy resin with an unsaturated monocarboxylic acid is carried out without a catalyst or in the presence of a Lewis base, for example a tertiary amine, a triarylphosphine, an acetate, an alkoxide or an ammonium or phosphonium halide, at from 60° to 130° C. in the presence of an inert solvent or in the melt. In this reaction, 0.6 to 1.1 equivalents of the unsaturated monocarboxylic acid are used per epoxide group.

The invention opens up an entirely novel, very simple way of thickening vinyl ester resins. This is because conventional thickening using alkaline earth metal oxides is only possible for vinyl ester resins when they have been modified in a prior reaction, for example using a dicarboxylic anhydride or a diisocyanate.

Vinyl ester urethanes

Vinyl ester urethanes are prepared by reacting a polyisocyanate with a hydroxyalkyl acrylate or methacrylate and a polyol. The products thus obtained are subsequently dissolved in a monomer which is capable of copolymerization. Characteristic of these resins is the functional unit:

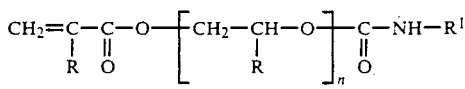

where n is 1 to 50, R is H or CH$_3$ and R$^1$ is an aliphatic or aromatic radical. Compounds of this type are described, for example, in U.S. Pat. Nos. 3,297,745, 4,360,653 and 4,374,229 and in EP 2,129.

A related class of compounds is disclosed in EP-A 204,497. It contains the functional unit

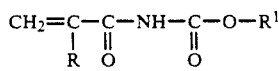

where R and R$^1$ are as defined above. Preparation is effected by reacting (meth)acrylic isocyanate with a hydroxyl-containing compound.

Typical representatives of polyisocyanates which may be mentioned for the preparation of vinyl ester urethane resins are the following: toluene diisocyante, diphenylmethane diisocyanate, isophorone diisocyanate, hexamethylene diisocyanate and the oligomers thereof. Examples of hydroxyalkyl (meth)acrylates are: hydroxyethyl (meth)acrylate, hydroxypropyl (meth)acrylate and trimethylolpropane di(meth)acrylate.

A large number of polyols, polyether polyols and polyester polyols can be reacted with the isocyanates. These include polyether polyols based on ethylene glycol, 1,2-propylene glycol and 1,4-butylene glycol, ethoxylated or propoxylated bisphenol A; polyester polyols based on maleic acid, phthalic acid or adipic acid. To carry out the preparation, the individual components, the polyisocyanate, the polyol and the hydroxyalkyl (meth)acrylate, are reacted for 1 to 5 hours at 50° to 100° C. The reaction accelerators used are primarily tertiary amines and tin compounds. Compounds which are known from the unsaturated polyester resins, such as quinones and hydroquinones, can be used to stabilize the reaction mixture. The customary peroxides and azo compounds act as free-radical initiators.

Allylated prepolymers

Allylated prepolymers can be prepared from diallyl compounds under carefully controlled conditions. Diallyl phthalate, diallyl terephthalate, diallyl isophthalate, diallyl diphenate, diallyl naphthalate, diallyl carbonate, diallyl oxalate, diallyl malonate, diallyl succinate, diallyl adipate, diallyl azelate, diallyl sebacate, dimethallyl phthalate and dimethallyl carbonate are preferred. The prepolymers are prepared from the monomers by homopolymerization at from 50° to 150° C., preferably at from 70° to 100° C., in the presence or absence of a solvent (e.g. ethyl acetate). The reaction is initiated by thermally unstable free-radical initiators. Azobisisobutyronitrile, for example, is suitable. The prepolymerization is terminated by reducing the temperature and/or adding an inhibitor (e.g. hydroquinone). The prepolymer solution can then be converted into its monomer using further copolymerizable vinyl compounds or a solution in copolymerizable monomers can be prepared by precipitation and isolation of the prepolymer.

Bismaleimide resins are prepared from a bismaleimide (BMI) and a comonomer. Bismaleimides have the general formula

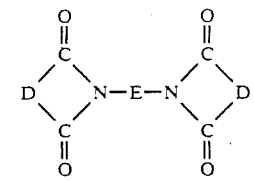

where D is an unsubstituted or substituted carbon-carbon double bond and E is a divalent radical having not less than two carbon atoms. Bismaleimides are disclosed, for example, in DE-A-2,040,094, DE-A-2,719,903 and DE-A-3,247,058. Besides bismaleimides, polymaleimides and mixtures of various bismaleimides are also suitable in principle. Preferred bismaleimides are 4,4'-bismaleimidodiphenylmethane, 4,4'-bismaleimidodpiphenyl ether, 3,3'-bismaleimidodiphenyl sulfone, 1,3-bismaleimidobenzene, 2,4-bismaleimidotoluene, 1,6-bismaleimidohexane and 2,2,4-trimethyl-1,6-bismaleimidohexane. It is also possible for not more than 20% of a monoimide to be present.

Suitable comonomers are polyamines, polyphenols, alkenylphenols, alkenylphenol ethers and aminophenols. Polyamines which are suitable as comonomers are disclosed, for example, in DE-A 1,770,867; 4,4'-diaminodiphenylmethane, 4,4'-diaminodiphenyl sulfone and 3,3'-diaminodiphenyl sulfone are preferred. Of the polyphenols which can be used, bisphenol A, bisphenol F and novolaks may be mentioned; others are listed in DE-A 2,459,925. Suitable alkenylphenols or alkenylphenol ethers are described in DE-A 2,627,045; o,o'-diallylbisphenol A is preferred. Oligomeric allyl- or propenyl-terminated sulfones or allylated dicyclopentadiene-polyphenols are likewise suitable. Aminophenols which can be employed are, for example, m- and p-aminophenol.

The BMI resins are obtained by initially reacting BMI and a comonomer through thermal treatment to give a prepolymer. The solubility of BMI resins in monomer A1 can be improved by the presence of maleimideamide components and maleic anhydride derivatives, as described in EP-A 135,964.

The solubility of BMI resins in the monomers can also be improved by adding acrylic acid.

Possible comonomers for BMI are alternatively the monomers A1 themselves. In this case, initial reaction of BMI with the comonomer is not necessary.

Hydrocarbon resins

For the purposes of the invention, hydrocarbon resins are unsaturated, high-molecular-weight hydrocarbons which are prepared, for example, by polymerization of butadiene, usually in combination with about 20% of styrene. The products are soluble, colorless, syrup-like liquids with molecular weights of up to 10,000. These butadiene resins are described in the monograph "Glasfaserverstärkte Kunststoffe [Glass Fiber-Reinforced Plastics], P. H. Selden, Springer-Verlag, Berlin, New York; Heidelberg, 1967, pages 54-56.

Saturated polyesters which can be crystallized

The polyesters can be obtained in a manner known per se by condensation in inert solvents, in the presence or absence of water entrainers. However, they are preferably prepared from the synthesis components by melt condensation at from 140° to 220° C., preferably 170° to 220° C. On cooling the melt, the polyesters preferably solidify as an amorphous glass-like material, sometimes partially crystalline, opaque, and have KSN (Krämer-Sarnow-Nagel) softening points of from 30° to 95° C., preferably 55° to 80° C., and can always be crystallized by warming in organic solvents, for example ethanol or the polyhydroxy compound. The molecular weights are from about 80 to 2,500, preferably from 200 to 1,500 and in particular from 240 to 1,000.

The synthesis component used for the preparation of polyesters is, in particular, isophthalic acid. Mixtures of terephthalic acid and aromatic dicarboxylic acids, such as isophthalic acid and orthophthalic acid, and/or saturated or unsaturated aliphatic dicarboxylic acids having 2 to 6 carbon atoms, e.g. succinic acid and adipic acid, are also highly suitable, the mixtures advantageously containing from 20 to 95, preferably 40 to 80 mol %, based on the dicarboxylic acid mixture, of terephthalic acid. For example, mixtures of terephthalic acid and isophthalic acid with not less than 20 mol %, preferably 40 to 80 mol %, of terephthalic acid, mixtures of terephthalic acid and ortho-phthalic acid with not less than 60 mole %, preferably 70 to 90 mol %, of terephthalic acid and mixtures of terephthalic acid and aliphatic, saturated or ethylenically unsaturated dicarboxylic acids having 2 to 6 carbon atoms with not less than 50 mol %, preferably 60 to 95 mol %, of terephthalic acid have proven successful. It is also possible to use terephthalic acid alone, but only in combination with certain alcohol mixtures. Polyesters which can be crystallized and are synthesized exclusively on the basis of aliphatic dicarboxylic acids and diols, e.g. from succinic acid and butane-1,4-diol, can, however, also be used.

The dicarboxylic acids mentioned can also be replaced by dicarboxylic acid derivatives, for example the monoesters and/or diesters thereof with monohydric and/or dihydric alcohols having 1 to 4 carbon atoms, or the anhydrides thereof.

Alcohols having 1 to 6 carbon atoms which can be used are preferably symmetric diols having 2 to 6 carbon atoms and primary OH groups. Specific examples which may be mentioned are ethylene glycol, propane-1,3-diol, butane-1,4-diol, pentane-1,5-diol, hexane-1,6-diol, dibromoneopentyl glycol and, in particular, neopentyl glycol. The diols may be employed individually or as mixtures, mixtures of neopentyl glycol and ethylene glycol being preferred.

For the preparation of polyesters, monoalcohols in amounts up to 20 mol %, preferably 5 to 15 mol %, e.g. benzyl alcohol, 1-hexanol or 2-ethyl-1-hexanol, asymmetric diols in amounts up to 60 mols %, preferably 5 to 50 mol %, e.g. 1,2-propylene glycol, 1,3-butylene glycol and dipropylene glycol, and polyhydric alcohols in amounts up to 30 mol %, preferably 2 to 20 mol %, e.g. glycerol and trimethylolpropane, can additionally be present besides the abovementioned symmetric diols, the mol % being based on the total amount of alcohol employed. While polyesters made from isophthalic acid are preferably condensed with a symmetric diol, some of the symmetric diol must be replaced by an asymmetric diol when exclusively terephthalic acid is used. For example, mixtures of symmetric diols, e.g. ethylene glycol, neopentylglycol, butane-1,4-diol, and hexane-1,6-diol, and asymmetric diols, e.g. 1,2-propylene glycol, dipropylene glycol and butane-1,3-diol, have proven successful. Polyether polyols and polyester polyols.

Polyester polyols have functionalities of from 2 to 6, preferably 2 to 4, and hydroxyl numbers of from 20 to 700, preferably 280 to 490. They are based on organic dicarboxylic acids and polyhydric alcohols, preferably diols. Specific examples which may be mentioned are aliphatic dicarboxylic acids, such as succinic acid, glutaric acid, pimelic acid, undecanedioc acid, dodecanedioic acid and preferably adipic acid and aromatic dicarboxylic acids, such as phthalic acid and terephthalic acid. Examples of dihydric and polyhydric, in particular dihydric, alcohols are: 1,2- and 1,3-propylene glycol, dipropylene glycol, 1,5-pentamethylene glycol, 1,8-oxtamethylene glycol, 1,10-decamethylene glycol, glyercol, trimethylolpropane, pentaerythritol and sugar alcohols, e.g. sorbitol, and preferably ethylene glycol, diethylene glycol, 1,4-butylene glycol and 1,6-hexamethylene glycol. Polyhydric alcohols which can be used are furthermore alkanolamines, dialkanolamines and trialkanolamines, e.g. ethanolamine, diethanolamine, triethanolamine and triisopropanolamine. The dicarboxylic acids and polyhydric alcohols mentioned may also be employed in the form mixtures. Polyester polyols made from adipic acid or mixtures of succinic acid, glutaric acid and adipic acid and diethylene glycol and alcohol mixtures comprising ethylene glycol/1,4-butylene glycol, ethylene glycol/diethylene glycol, ethylene glycol/trimethylolpropane, diethylene glycol/trimethylolpropane, ethylene glycol/pentaerythritol, ethylene glycol/triisopropanolamine and diethylene glycol/triisopropanolamine have proven particularly successful and are therefore preferably used.

The polyester polyols have molecular weights of from about 220 to 3,000 and preferably from 300 to 800.

The polyester polyols mentioned, which may be employed individually or as mixtures, may also be replaced by homogeneous mixtures, liquid at 10° to 30° C., of the abovementioned polyester polyols and soluble, crystalline, organic components, e.g. hydroxyl-containing polyesters made from aromatic dicarboxylic acids and, preferably, unsubstituted linear diols.

Polyether polyols have functionalities of from 2 to 8, preferably 2 to 4, and hydroxyl numbers of from 20 to 800, preferably 25 to 700, and can be prepared from one or more alkylene oxides having 2 to 4 carbon atoms in the alkylene radical and an initiator molecule containing 2 to 8, preferably 2 to 4, active hydrogen atoms, by known processes, for example by anionic polymerization using alkali metal hydroxides, such as sodium hydroxide or potassium hydroxide, or alkali metal alkoxides, such as sodium methoxide, potassium methoxide or potassium isopropoxide, as catalysts or by cationic polymerization using Lewis acids, such as antimony pentachloride, boron fluoride etherate, inter alia, as catalysts.

Suitable alkylene oxides are, for example, tetrahydofuran, 1,3-propylene oxide, 1,2- and 2,3-butyleneoxide, styrene oxide, epichlorohydrin and preferably ethylene oxide and 1,2-propylene oxide. The alkylene oxides may be used individually, in succession or as mixtures. Examples of suitable initiator molecules are: water, organic dicarboxylic acids, such as succinic acid, adipic acid, phthalic acid and terephthalic acid, aliphatic and aromatic, unsubstituted or N-mono, N,N-and N,N'-dialkyl-substituted diamines having 1 to 4 carbon atoms in the alkyl radical, such as unsubstituted or mono- or dialkyl-substituted ethylenediamine, diethylenetriamine, triethylenetetramine, 1,3-propylenediamine, 1,3- and 1,4-butylenediamine, 1,2-, 1,3-, 1,4-, 1,5- and 1,6-hexamethylenediamine, phenylenediamine, 2,4- and 2,6-toluylenediamine and 4,4'-, 2,4'- and 2,2'-diaminodiphenylmethane. The particularly important polyester polyols, prepared from compounds of the group mentioned, are N,N,N',N'-tetrakis-(2-hydroxyethyl)-ethylenediamine, N,N,N',N'-tetrakis-(2-hydroxypropyl)ethylenediamine, N,N,N',N'',N''-pentakis-(2-hydroxypropyl)diethylenetriamine, phenyldiisopropanolamine and higher ethylene oxide adducts of aniline.

Suitable initiator molecules are furthermore alkanolamines, such as ethanolamine, diethanolamine, N-methyl- and N-ethylethanolamine, N-methyl- and N-ethyldiethanolamine and triethanolamine, ammonia, hydrazine and hydrazides. Polyhydric, in particular dihydric and/or trihydric alcohols, such as ethylene glycol, 1,2-propylene glycol, 1,3-propylene glycol, diethylene glycol, dipropylene glycol, 1,4-butylene glycol, 1,6-hexamethylene glycol, glycerol, trimethylolpropane, pentaerythritol, sorbitol and sucrose, are preferably used.

The polyether polyols have molecular weights of from 200 to 7,000 and preferably 500 to 6,500. Like the polyester polyols, they can be used individually or in the form of mixtures.

It is also possible to use mixtures of polyester polyols and butane-1,4-diol, hexane-1,6-diol and asymmetric diols, e.g. 1,2-propylene glycol, dipropylene glycol and butane-1,3-diol.

Epoxy resins

For the purposes of the invention, epoxy resins are mixtures of glycidyl ethers of polyhydric phenols or alcohols with curing agents. The epoxide equivalent weights of the epoxy resins may be from 60 to 10,000. The epoxy resins are synthesized by reacting a polyhydric phenol or alcohol with epichlorohydrin and subsequently dehydrochlorinating the products using sodium hydroxide solution. The precise preparation conditions and typical representatives of epoxy resins are described, for example, in "Handbook of Epoxy Resins" by Henry Lee and Kris Neville, McGraw-Hill, 1967.

Solutions of epoxy resins in unsaturated monomers are described, for example, in U.S. Pat. No. 4,579,931 or by Mlesiva (Angew. Makromol. Chemie 127, 1984, p. 115).

Preferred epoxy resins are those based on bisphenol A and having an epoxide equivalent weight of from 140 to 1,000, but also polymers derived therefrom, such as the phenoxy resins from Union Carbide. In addition, the epoxy resins described above as precursors for vinyl ester resins are preferred components of epoxy resin solutions. Furthermore, epoxy resins based on aromatic amines, such as diaminodiphenylmethane and diaminodiphenyl sulfone, are a preferred class for the purposes of the invention.

The monomers which can be cured by means of free radicals and are usually used in unsaturated polyester resins are also employed in the epoxy resins. These include styrene, substituted styrenes, esters of unsaturated carboxylic acids, such as acrylic acid or methacrylic acid, and allyl compounds, such as diallyl phthalate.

Suitable curing agents are carboxylic anhydrides, polynuclear phenolic compounds and salts of oxonium, sulfonium and phosphonium compounds.

Thermoplastic polymers

Thermoplastics can be obtained as homopolymers or copolymers by known processes of free-radical, cationic or anionic polymerization. Examples thereof are polystyrene, polymethacrylates, polyacrlates, poly(vinyl esters), poly(vinyl chloride), polypropylene, polyethylene and poly(vinyl ethers). Polycondensates, for example poly(alkylene terephthalates), polyamides, aromatic polyethers, polyether imides, polyether ketones, polycarbonates, poly(phenylene sulfide), polysulfones and cellulose esters are also suitable. They can be dissolved, dispersed or emulsified in the monomers A1.

Elastomers

Elastomers can also be employed advantageously for the molding compositions according to the invention, in similar fashion to thermoplastic polymers. They are either soluble or finely dispersible in the polymerizable monomers by known processes. A survey of the elastomers in question, including a description of the properties, structure and preparation, is given by the monograph: "Rubber Chemistry", J. A. Brydson, Applied Science Publishers Ltd., London, 1978. Specific examples which may be mentioned are: polydienes, such as polybutadiene, polyisoprene, polychloroprene and, in particular, block copolymers comprising 40 to 95% by weight of a diolefin, e.g. butadiene, isoprene or chloroprene, and 60 to 5% by weight of a vinyl aromatic compound, e.g. styrene or α-methylstyrene. They are prepared by anionic polymerization, e.g. using organolithium or organosodium compounds, and have a block-like structure. The blocks may have sharp or indistinct boundaries, depending on the preparation process. The individual blocks may comprise only a single monomer, but it is also possible for two monomers to be copolymerized, in an irregular distribution, in one block. The block copolymers may comprise two, three, four or even more individual blocks. In order to achieve particular effects, the block copolymer may contain carboxyl-groups. The molecular weight of the block copolymers is from 20,000 to 200,000, preferably from 50,000 to 150,000. In addition, ethylene-propylene-diene copolymers (EPDM), acrylic rubber, polyurethane elastomers and polyisobutylene can be employed.

A wide range of starting material combinations is available for building up the liquid reactive systems, starting from monomers which can be polymerized by means of free radicals, and mixtures thereof with one another and with oligomers and/or thermoplastic polymers and/or elastomers. These possible combinations correspond to a wide range of properties for the cured molding compositions according to the invention. However, it is also worth stating that minor amounts of isocyanate-reactive polyester polyols or polyether polyols can be admixed with the reactive systems in order to reduce the viscosity thereof. These are preferably difunctional so as to exclude premature gelling of the molding compositions during thickening. The diols, alkanolamines and aliphatic diamines which are customary in polyurethane chemistry, and also polyester diols, poly(alkylene oxides) and polytetrahydrofurans are suitable.

B. Component B1 is an aminobenzoic acid derivative of the general formula:

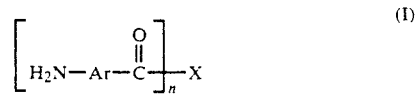

where the symbols have the following meaning:
Ar is a divalent, substituted or unsubstituted aromatic radical;

n is 1 or 2;

X is $-O-R^1$, $-NH-R^1$, $-N(R^1)_2$, $-O-R-O-$, $-NH-R-NH-$, $-NH-R-O$,

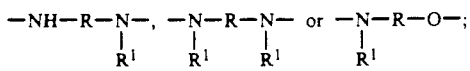

R is a polyalkylene, polyether, polyester, polyamide or polycarbonate group; and $R^1$ is alkyl or aryl, preferably having up to 12 carbon atoms.

Suitable aromatic rings Ar are, for example, benzene, naphthalene, anthracene and phenanthrene and heterocyclic 5- and 6-membered rings, and also polycyclic compounds which contain N, O and S heretoatoms and are unsubstituted or substituted by alkyl, alkoxy or halogen.

Specific examples of suitable amines are: esters and amides of o-, p- or m-aminobenzoic acid, such as the methyl, ethyl, benzyl and cyclohexyl esters, anthranilamides and anthranilic esters, and the products of the reaction of aminobenzoic esters or isatoic anhydride with polyols, polyether polyols, alkanolamines, primary and secondary amines, for example propane-1,3-diol di-p-aminobenzoate, ethylene glycol di-p-aminobenzoate, hexane-1,6-diol di-p-aminobenzoate, butane-1,4-diol di-p-aminobenzoate, nonane-1,9-diol di-p-aminobenzoate, 1,6-hexamethylenediaminodi-p-aminobenzamide, 1,2-ethylenediaminedi-p-aminobenzamide and the corresponding o-aminobenzoates.

Particularly preferred aminobenzoic acid derivatives of the formula I are those in which X is $-O-R-O-$ or $-NH-R-NH-$, and R is a polyester group having a degree of polymerization of from 1 to 300, in particular 1 to 50, or an alkylene group having 2 to 20, in particular 2 to 6, carbon atoms.

The aminobenzoic acid derivatives are usually employed alone or as mixtures with one another in a concentration range from 0.001 to 0.5, preferably 0.005 to 0.05, amine equivalents, based on 100 g of the total amount of reactive system A and component B1. They are dissolved, or at least finely dispersed, in the liquid reactive system A. If the amine content is too low, adequate thickening is not achieved, and if the amine content is too high, the system thickens excessively quickly, which means that, for example, fiber impregnation is no longer possible.

In a preferred embodiment, additional aromatic secondary N-alkyl- or N-aryl-substituted amines can be present besides the aromatic primary amines. Examples of these are: N-alkylanilines and N-alkylnaphthylamines having 1 to 30 carbon atoms in the alkyl chain, for example N-methyl-, N-ethyl-, N-isopropyl-, N-cyclohexyl-, N-benzyl-, N-lauryl- and N-stearylanilines and β-hydroxyethyl- and β-hydroxypropylaniline and diphenylamine. Suitable secondary amines which may be present are also N-substituted aromatic diamines, such as N,N'-diphenylethanediamine, N,N'-diphenylhexamethylenediamine, N,N'-diphenyl-1,5-diamino-3-oxapentane, N,N'-dicyclohexyl-p-phenylenediamine, N,N'-diisopropyl-m-phenylenediamine and N,N'-diisopropyl-4,4'-diaminodiphenylmethane.

These secondary amines retard thickening, which may be desired when the intention is to carry out the impregnation, e.g. of reinforcing fibers, using the composition still in liquid form and if the composition is not to be thickened until it has been applied to the fibers.

It has been shown that aliphatic amines, e.g. in accordance with DE-A 2,715,294 and EP-A 28,470, are not suitable since thickening together with isocyanates proceeds so quickly and uncontrollably that processing of the material becomes impossible. In addition, crosslinking in the thickened molding compositions occurs very easily.

B2 Isocyanates

The isocyanates are employed in an amount such that at least 0.1% of all isocyanate-reactive groups are reacted and such that the excess of isocyanate groups over the isocyanate-reactive groups is a maximum of 50%. The isocyanate:isocyanate-reactive group ratio is thus from 1.5 to 0.001:1, preferably from 1.0 to 0.01:1. Isocyanate-reactive groups contain active hydrogen. The most important are amine, hydroxyl and carboxyl groups. If too little isocyanate is employed, inadequate thickening occurs; if the isocyanate excess is too large, the result is premature crosslinking due to urethane bridge formation. Relatively small amounts of isocyanate are sufficient if components A and D do not contain reactive groups, i.e. if the isocyanate is used only for formation of the urea structure through reaction with the aromatic amine. The ratio between the number of equivalents of isocyanate groups and amine groups should preferably be from 0.1:1 to 1.5:1, in particular from 0.5:1 to 1:1.

Suitable isocyanates are aliphatic, cycloaliphatic, araliphatic and, preferably, aromatic polyisocyanates. Specific examples which may be mentioned are: alkylene diisocyanates having 4 to 12 carbon atoms in the alkylene radical, such as 1,12-dodecamethylene diisocyanate, tetramethylene 1,4-diisocyanate and, preferably, hexamethylene 1,6-diisocyanate; cycloaliphatic diisocyanates, such as cyclohexane 1,3-diisocyanate and cyclohexane 1,4-diisocyanate, and any mixtures of these isomers, 1-isocyanato-3,5-trimethyl-5-isocyanatomethylcyclohexane (isophorone diisocyanate), 2,4- and 2,6-hexahydrotoluylene diisocyanate and corresponding isomer mixtures, 4,4'-, 2,2'- and 2,4'-dicyclohexylmethane diisocyanate and the corresponding isomer mixtures, and, preferably, aromatic diisocyanates and polyisocyanates, such as 4,4'-, 2,4'- and 2,2'-diisocyanatodiphenylmethane and the corresponding isomer mixtures, 2,4- and 2,6-diisocyanatotoluene and the corresponding isomer mixtures, 1,5-diisocyanatonaphthalene, polyphenylpolymethylene polyisocyanates, 2,4,6-triisocyanatotoluene and, preferably, mixtures of diphenylmethane diisocyanates and polyphenylpolymethylene polyisocyanates (crude MDI). The diisocyanates and polyisocyanates mentioned may be employed individually or in the form of mixtures.

Further examples which may be mentioned are: m-phenylene diisocyanate, 4,4'-bisphenylene diisocyanate, 2,4'-diisocyanatodiphenyl sulfone, 3,3'-diisocyanatodiphenyl sulfone, 4,4'-diisocyanatodiphenyl sulfide and 1,5-tetrahydronaphthylene diisocyanate.

In addition, modified polyisocyanates, i.e. products obtained by chemical reaction of the above diisocyanates and/or polyisocyanates, are frequently used. Specific examples of modified organic diisocyanates and polyisocyanates are: carbodiimide-containing polyuisocyanates as per German Patent 1,092,007, allophanate-containing polyisocyanates, as described, for example, in British Patent 994,890, the laid-open applications of Belgian Patent 761,626 and Dutch Laid-Open Application NL-OS 7,102,524, isocyanurate-containing polyisocyanates, as described, for example in German Patents 1,022,789, 1,222,067 and 1,027,394 and German Laid-Open Applications DOS 1,929,034 and DOS 2,004,048. Urethane-containing polyisocyanates, as described, for example, in the laid-open applications of Belgian Patent 752,261 or in U.S. Pat. No. 3,394,164, acylated urea-containing polyisocynates, for example as per German Patent 1,230,778 biuret-containing polyisocyanates, e.g. as per German Patent 1,101,394 and British Patent 889,050; polyisocyanates prepared by telomerization reactions, e.g. as per the laid-open applications of Belgian Patent 723,640, ester-containing polyisocyanates, as mentioned, for example, in British Patents 965,474 and 1,072,956, and U.S. Pat. No. 3,567,765 and in German Patent 1,231,688.

However, preference is given to the following: urethane-containing polyisocyanates, for example 4,4'-diphenylmethane diisocyanate or toluylene diisocyanate which have been modified with low-molecular-weight diols, triols or polyoxypropylene glycols, polyisocyanates containing carbodiimide groups and/or isocyanurate rings, e.g. based on diphenylmethane diisocyanates and/or toluylene diisocyanates and in particular toluylene diisocyanates, diphenylemthane diisocyanates, mixtures of diphenylmethane diisocyanates and polyphenylpolymethylene polyisocyanates (crude MDI) and mixtures of toluylene diisocyanates and crude MDI.

Prepolymers containing isocyanate groups are likewise suitable. They are obtained by reacting a relatively high-molecular-weight material containing at least two isocynate-reactive groups with at least one polyisocyanate. Polyethers polyols and polyester polyols, which are described in more detail under E., can be employed. Amine-terminated polyethers are likewise suitable. These are prepared, for example, by reacting a hydroxyl-terminated polyether with ammonia or a secondary amine and hydrogen. This reaction is described, for example, in U.S. Pat. No. 3,654,376. The isocyanate-reactive material is reacted with a stoichiometric excess of a polyisocyanate. If reactive starting materials are employed, the reaction proceeds at room temperature or slightly elevated temperature after simply mixing the components. In the case of less reactive starting compounds, the reaction is carried out at elevated temperature and in the presence of a catalyst. Suitable catalysts are, for example, tertiary amines, such as dimethylbenzylamine, N,N,N',N'-tetramethyldiaminoethyl ether, dimethylpiperazine, 1,2-dimethylimidazole, 1-azabicyclo[3.3.0]octane and, preferably, triethylenediamine, metal salts, such as tin dioctanoate, lead octanoate, tin diethylhexanoate and, preferably, tin(II) salts and dibutyltin dilaurate, and also mixtures of tertiary amines and organic tin salts.

Besides the preferred polyisocyanates, it is also possible to employ monofunctional isocyanates, e.g. phenyl isocyanate, benzenesulfonyl isocyanate, butyl isocyanate, chlorocarbonyl isocyanate, chlorophenyl isocyanate, cyclohexyl isocyanate, 3,4-dichlorophenyl isocyanate, naphthyl isocyanate, toluene-4-sulfonyl isocyanate, trichloroacetyl isocyanate and trifluoromethylphenyl isocyanate.

In order to regulate the thickening rate, it is also possible to employ blocked isocyanates. Such blocked isocyanates are described, for example, in Z. W. Wicke, Progress in Organic Coatings, 9 (1981) 3-28.

C. The polymerization initiators employed are customary peroxides which decompose into free radicals at above 50° C. Their half life period at 50° C. should preferably be longer than 100 hours. Diacyl peroxides, peroxydicarbonates, peroxyesters, perketals, ketone peroxides, hydroperoxides and dialkyl peroxides are suitable. Specific examples are: succinyl peroxide, diacetyl peroxide, benzoyl peroxide, t-butyl peroctoate, p-chlorobenzoyl peroxoide, t-butyl perisobutyrate, 3,5,5-trimethylcyclohexanone perketal, 2,5-dimethylhexane 2,5-diperbenzoate, t-butyl peracetate, t-butyl perisononanoate, di-t-butyl diperphthalate, 2,2-bis(t-butylperoxy)butane, t-butyl perbenzoate, dicumyl peroxide, 2,5-dimethyl-2,5-bis(t-butylperoxy)hexane, t-butyl hydroperoxide, cumene hydroperoxide, di-t-butyl peroxide, 2,5-dimethyl-2,5-bis(t-butylperoxy)hexyne, 1,1,4,4,7,7-hexamethylcyclo-4,7-diperoxynonane, diamyl peroxide, t-butyl perethylhexanoate, dilauroyl peroxide, t-butylcumyl peroxide, γ-t-butyl peroxyvalerolacetone, dimyristyl peroxydicarbonate and bis(4-t-butylcyclohexyl) peroxydicarbonate. CC-labile compounds and azo compounds are also suitable. Initiators which decompose below 50° C. are not suitable. Since they reduce the shelf life and result in premature gelling of the molding composition. An example of an initiator of this type is acetylacetone peroxide. Cold-curing systems likewise have an excessively short shelf life.

D. Additives

Suitable additives are, in particular:
1. Reinforcing fibers
2. Fillers
3. Inhibitors
4. Polyfunctional hydroxyl compounds
5. Lubricants, e.g. waxes
6. Paraffins for reducing the surface evaporation
7. Flame retardants, in particular halogen compounds
8. Conventional thickeners, such as oxides or hydroxides of lithium, magnesium, calcium, aluminum or titanium
9. Thickening accelerators, e.g. ammonium chlorides, phosphonium chlorides, sulfonium halides, water, polyols or propane-1,2-diol
10. Curing accelerators, e.g. metal complexes or aromatic amines.

D1 Reinforcing fibers which can be used are the known inorganic and organic fibers, e.g. made from glass, carbon, cellulose, polyethylene, polycarboxylates or nylon. They may be in the form of short fibers having a length of up to 5 cm or in the form of round fibers, but preferably as long fibers in the form of individual rovings, webs or parallel rovings, fiber mats, non-woven fibers, woven fibers or knitted fibers.

The fibers are employed in amounts of from 0 to 400% by weight, preferably 30 to 350% by weight, based on A. The particularly preferred glass content is 100 to 300% by weight, based on A, for glass-fiber mats, 30 to 150% by weight for rovings and 150 to 350% by weight for undirectional laid fibers.

D2 Suitable fillers are, for example, conventional finely powdered or granular fillers, such as chalk, kaolin, quartz powder, dolomite, feltspar, metal powders, aluminum oxide hydrate, cement, talc, kieselguhr, sawdust, wood chippings, pigments and the like. Their content is preferably 5 to 300% by weight, based on A.

D3 Suitable inhibitors are phenolic compounds, such as hydroquinone, substituted hydroquinones, pyrocatechol, tert.-butylpyrocatechol, ring-substituted pyrocatechols, quinones, such as benzoquinone, naphthoquinone, chloranil, nitrobenzenes, such as m-dinitrobenzene, thiodiphenylamine, N-nitroso compounds, such as N- nitrosodiphenylamine and salts of N-nitroso-N-cyclohexylhydroxylamine, and mixtures thereof. Additional stabilizers which are suitable are also salts of divalent copper, for example copper naphthenate or copper octanoate, and quaternary ammonium salts. They are employed in amounts of from 0.001 to 0.1% by weight, based on A.

D4 Polyfunctional hydyroxy compounds

The molding composition may contain relatively short-chain polyfunctional hydroxy compounds. Specific examples which may be mentioned are: ethylene glycol, propylene glycol, diethylene glycol, dipropylene glycol, triethylene glycol, tripropylene glycol, butane-1,4-diol, trimethylolpropane, bisphenols, hydroquinone, pyrocatechol, resorcinol, tetraethylene glycol, glycerol, low-molecular-weight ethylene oxide and/or propylene oxide derivatives, preferably in amounts of from 0.1 to 15% by weight, based on A.

The molding compositions according to the invention are thickened, tack-free, uncrosslinked compositions with a long shelf life which may exist in sheet-like, pasty or granulated form. Their viscosity with 150 parts of calcium carbonate (®Millicarb) per 100 parts of A+B at 23° C. should be not less than 500,000 mPa.s, preferably not less than 1,000,000 mPa.s, measured using a Brook-field viscosimeter.

If the viscosity is low, the compositions can no longer be regarded as tack-free and problems occur during processing. The viscosity should preferably be from $2 \times 10^6$ to $200 \times 10^6$ mPa.s. Above $200 \times 10^6$ mPa.s, the compositions are solid and hard, and processing difficulties again occur. Solid compositions of this type can in principle be processed by increasing the temperature, but there is then the danger of premature crosslinking.

Uncrosslinked means that there must be no three-dimensional molecular network with atomic bonds. In practice, crosslinking can be detected by attempting to dissolve the composition in a suitable organic solvent, preferably dimethylformamide, dimethyl sulfoxide or acetone, if necessary with warming. The maximum insoluble residue here is 10% by weight, preferably less than 1% by weight, of the composition, naturally with the exception of the reinforcing fibers and fillers.

Long storage life means that the molded composition must still be uncrosslinked, i.e. soluble in accordance with the definition above, after storage at room temperature for not less than one day. The molding compositions according to the invention preferably have longer shelf lives, for example more than 30 days.

A preferred process for the preparation of the molding compositions according to the invention comprises mixing components A, B1, C and D (with the exception of long reinforcing fibers), adding component B2 at less than 50° C. and thereby initiating thickening, if desired applying the still free-flowing composition to reinforcing fibers, and then completing the thickening. In a further preferred process, components A, B2, C and D are firstly mixed, component B1 is then added at less than 50° C. and thickening is thereby initiated. In order to accelerate thickening, it may in some cases be expedient to warm the composition briefly to not more than 100° C., preferably not more than 50° C. Full thickening of the composition may take several days, but is preferably virtually complete in less than one hour. The thickened compositions can be stored for a relatively long period before processing, for example in wound, stacked or even packed form. Compression molding, transfer molding, injection molding and thermoforming are suitable for processing the molding compositions, with the curing being carried out at above 50° C., preferably at from 80° to 200+ C. and in particular at from 120° to 180° C.

The parts and percentages given in the Examples are by weight.

EXAMPLE

Preparation of UP resins

1. An unsaturated polyester having an acid number of 0.7 and a hydroxyl number of 135 was prepared by two-step condensation from isophthalic acid, ethylene glycol and neopentyl glycol (1st step) and maleic anhydride (2nd step) in the molar ratio 0.5:0.98:0.98:1. It was dissolved in styrene to form a 64% strength solution and stabilized using 130 ppm of hydroquinone.

2. An unsaturated polyester was prepared from maleic anhydride and propane-1,2-diol in the molar ratio 1:1.35 and dissolved in styrene to form a 65% strength solution. This solution, with an acid number of 2.3, was stablized using 185 ppm of hydroquinone.

3. An unsaturated polyester having an acid number of 50 and a hydroxyl number of 60 was prepared from maleic anhydride, o-phthalic acid and propane-1,2-diol in the molar ratio 1:0.5:1.5 and dissolved in styrene to form a 65% strength solution. This solution was stabilized using 100 ppm of hydroquinone.

4. 784 parts of maleic anhydride, 347 parts of ethylene glycol and 426 parts of propane-1,2-diol are heated to 190° C. over the course of 2 hours while stirring and while passing nitrogen over the mixture. The condensation is continued at this temperature until an acid number of 27 is reached. 0.184 part of toluhydroquinone are added to 1,300 parts of the unsaturated polyester thus obtained, and the mixture is dissolved in 557 parts of diallyl phthalate. The viscosity of the resin at 23° C. is 6,750 mPa.s.

5. 223 parts of isophthalic acid, 110 parts of propane-1,2-diol and 212 parts of diethylene glycol are heated to 190° C. over the course of 4 hours while stirring and passing nitrogen over the mixture. The esterification is continued at this temperature until the acid number is 10. 196 parts of maleic anhydride are added, and the condensation is carried out until the acid number is 35. 0.1 part of hydroquinone is added to 650 parts of the unsaturated polyester thus obtained, and the mixture is dissolved in 350 parts of styrene at 120° C.

Preparation of vinyl ester resins 1. 380 parts of a bisphenol A diglycidyl ether (Epikote 828, Shell) and 172 parts of methacrylic acid are reacted at 100° C. in the presence of 0.5 part of tetramethylammonium chloride as catalyst and 0.1 part of hydroquinone as inhibitor until 95% of the epoxide groups have been converted (determined by titration with HBr). The melt is subsequently dissolved in 368 parts of styrene (40%).

2. 95 parts of a bisphenol A diglycidyl ether having an epoxide equivalent weight (EEW) of 188 and 490 parts of a bisphenol A diglycidyl ether having an EEW of 490 are esterified using 129 parts of methacrylic acid at 100° C. in the presence of 0.5 part of tetramethylammonium chloride as catalyst and 0.1 part of hydroquinone as inhibitor until 95% of the epoxide groups have been converted. The melt is dissolved whilst hot in 476 parts of styrene (40%).

Aromatic amines according to the invention

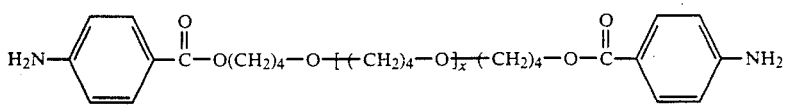
1.

This amine-terminated polyether is prepared by stirring 1,100 g of polytetrahydrofuran (molecular weight 1,000, hydroxyl number 111), 363 g of ethyl p-aminobenzoate and 141 mg of titanium tetrabutylate at from 190° to 200° C. under nitrogen in a glass flask until ethanol no longer distils. The amine number is 88.

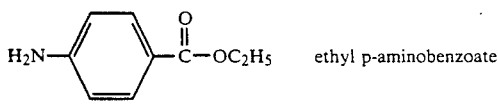 ethyl p-aminobenzoate
2.

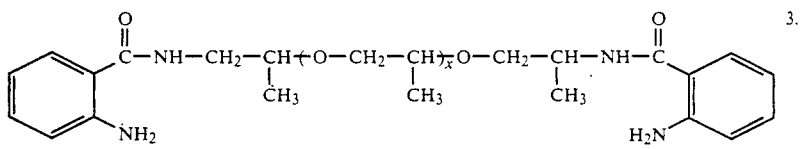
3.

115 parts of ether diamine D 230 (molecular weight 230 g/mol) are dissolved in 200 parts of 1-methoxy-2-propanol. 163 parts of isatoic anhydride are added a little at a time at from 40° to 50° C. Vigorous evolution of $CO_2$ commences. When the gas evolution is complete, two parts of 50% strength sodium hydroxide solution are added, and the mixture is heated at 60° to 70° C. for 0.5 hours. After cooling, the mixture is washed twice with water, dried over $MgSO_4$ and freed from solvent on a rotary evaporator. The amine number is 197.

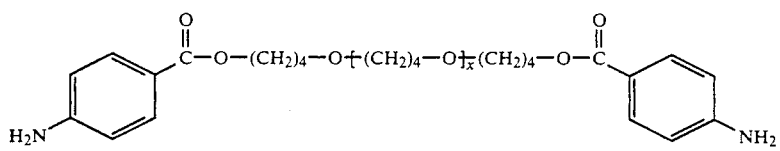
4.

975 parts of polytetrahydrofuran (molecular weight 650), 495 parts of ethyl p-aminobenzoate and 0.67 part of titanium tetrabutylate are heated to 190° C. over the course of 30 minutes while stirring and passing nitrogen over the mixture, and the mixture is kept at this temperature for 14 hours. 1,340 parts of a brown liquid are obtained.

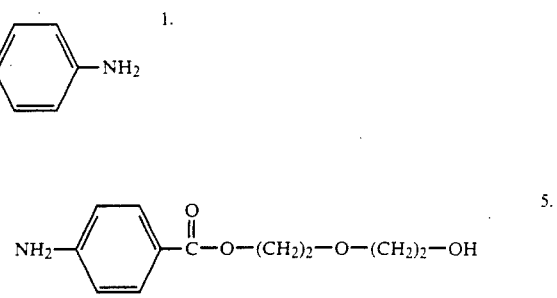
5.

424 parts of diethylene glycol, 660 parts of ethyl p-aminobenzoate and 0.45 part of titanium tetrabutylate are heated to 190° C. over the course of 30 minutes and kept at this temperature for 17 hours. 890 g of a pale yellow, partially crystalline substance are obtained.

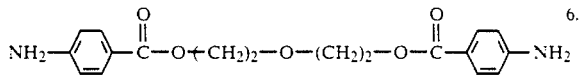
6.

212 parts of diethylene glycol, 660 parts of ethyl p-aminobenzoate and 0.35 part of titanium tetrabutylate are heated to 190° C. over the course of 30 minutes and kept at this temperature for 19 hours. 680 g of a pale brown solid are obtained.

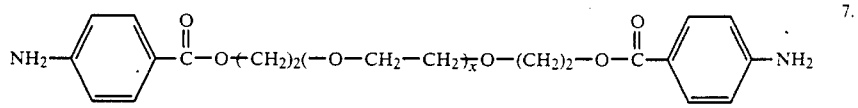
7.

900 parts of polyethylene glycol (Pluriol E 600, BASF, molecular weight 600), 495.6 parts of ethyl p-aminobenzoate and 0.25 part of titanium tetrabutylate are heated to 195° C. over the course of 3 hours while stirring and under a stream of nitrogen, kept at this temperature for 9.5 hours and subsequently condensed at 200° C. for 14.5 hours. A brown liquid having an amine number of 122 and a viscosity (23° C.) of 10,500 mPa.s is obtained.

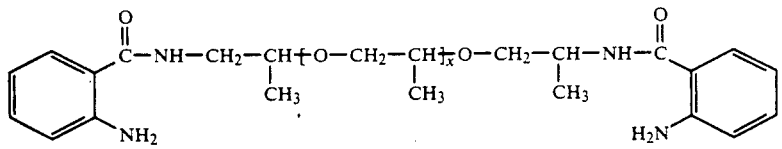

200 parts of ether diamine D 2000 (molecular weight 2,000 g/mol) are treated at room temperature with 163 parts of isatoic anhydride a little at a time. $CO_2$ is evolved vigorously and the internal temperature rises to 45° C. The mixture is allowed to react for a further 2 hours at this temperature, 2 parts of 50% strength NaOH are added, and the mixture is warmed at 60° C. for 0.5 ours. After cooling, the product is taken up in methylene chloride, washed with water, dried over $MgSO_4$ and free from solvent on a rotary evaporator. The amine number is 43.6. Amines not according to the invention:

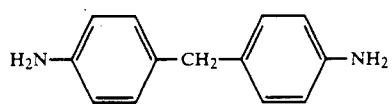

4,4'-diaminodiphenylmethane

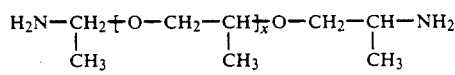

(from EP-A 28,470) molecular weight 230

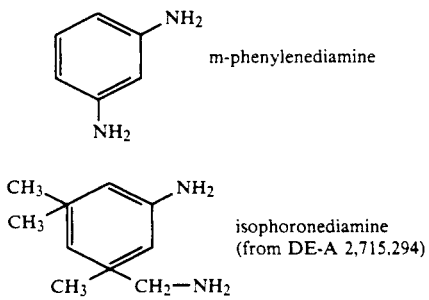

Isocyanates

Isocyanate 1 is pure 4,4'-diphenylmethane diisocyanate having an NCO content of 33.6%.

Isocyanate 2 is crude 4,4'-diphenylmethane diisocyanate having an NCO content of 31.0% and a viscosity of 200 to 220 mPa.s at 25° C.

Isocyanate 3 is an isocyanate prepolymer based on a polyether polyol of molecular weight 450 and hydroxyl number 250 and based on dipropylene glycol, and has a NCO content of 23.0% and a viscosity of 700 mPa.s at 25° C.

EXAMPLE 1

Thickening experiment for UP resin 1 without filler

| | |
|---|---|
| 70.0 parts of UP resin 1 | (175.00 g) |
| 20.0 parts of amine 1 | (50.00 g) |
| 10.0 parts of styrene | (25.00 g) |
| 11.8 parts of isocyanate 1 | (29.46 g) |

The components were mixed with one another and stored in an air-tight container at room temperature. After 45 minutes, the mixture was stiff, and the viscosity after 24 hours was $32.8 \times 10^6$ mPa.s (23° C.).

COMPARATIVE EXPERIMENT 200.0 parts of UP resin 1
23.8 parts of isocyanate 1

The components were mixed and stored in a sealed container at room temperature. The viscosity increased only very slowly, and the mixture was still free-flowing after 3 days.

Viscosity/23° C.: $1.4 \times 10^6$ (mPa.s) after 4 days
Viscosity/23° C.: $1.77 \times 10^6$ (mPa.s) after 10 days In Example 1 and in the comparative example, the amount of isocyanate was such that 70% of the total number of end groups comprising OH and $NH_2$ groups were able to react.

EXAMPLES 2 TO 13

Various UP resins were thickened in the presence of the filler chalk (®Millicarb) and zeolite (®Baylith L). Examples 9–13 are not according to the invention. The UP resins 1 and 2 cannot be thickened using alkaline earth metal oxides.

TABLE 1

| Example | 2 | 3 | 4 | 5 | 6 | 7 | 8 | 9 | 10 | 11 | 12 | 13 |
|---|---|---|---|---|---|---|---|---|---|---|---|---|
| UP Resin (parts) | 1/70 | 1/70 | 1/85 | 2/70 | 3/70 | 1/81 | 1/90 | 1/90 | 1/86 | 1/90 | 1/90 | 1/90 |
| Amine (parts) | 1/20 | 1/20 | 2/5.2 | 1/20 | 1/20 | 3/9 | 6/4.86 | 9/3.1 | 10/3.6 | 11/1.7 | 12/2.6 | 12/2.6 |
| Styrene (parts) | 10 | 10 | 10 | 15 | 15 | 10 | 10 | 10 | 10 | 10 | 10 | 10 |
| Isocyanate 1 (parts) | 2.49 | 8.27 | 13.5 | 4.97 | 4.97 | 5.6 | 8.75 | 14.1 | 8.3 | 9.04 | 9.04 | 3.9$^x$ |
| Equivalents of $NH_2$/based on 100 g of A + B1 | 0.031 | 0.031 | 0.031 | 0.031 | 0.031 | 0.031 | 0.028 | 0.031 | 0.031 | 0.031 | 0.031 | 0.031 |
| Equivalents of NCO/based on 100 parts of A + B1 | 0.02 | 0.066 | 0.11 | 0.04 | 0.04 | 0.045 | 0.070 | 0.11 | 0.066 | 0.072 | 0.072 | 0.031 |
| Chalk (parts) | 150 | 150 | 150 | 150 | 150 | 150 | 150 | 150 | 150 | 150 | 150 | 150 |
| Zeolite (parts) | 5 | 5 | 5 | 5 | 5 | 5 | 5 | 5 | 5 | 5 | 5 | 5 |
| Thickening behavior: | | | | | | | | | | | | |
| Tack-free after min | 180 | 180 | 360 | 40 | 10 | | 30 | 0.2 | tacky after 9 days | <1 | >60 | 40 |
| Viscosity at 23° C. | 44.8 | 38.0 | 7.84 | 49.6 | 108.8 | 13.6 | 23.2 | — | 0.07 | — | — | — |

TABLE 1-continued

| Example | 2 | 3 | 4 | 5 | 6 | 7 | 8 | 9 | 10 | 11 | 12 | 13 |
|---|---|---|---|---|---|---|---|---|---|---|---|---|
| ($10^6$ mPa.s after 48 h) | | | | | | (after 21 h) | (after 24 h) | dry stiff | still free-flowing | stiff | cross-linked insol. in DMF | cross-linked insol. in DMF |

*The isocyanate was not added until 24 hours after the remaining components were mixed.

EXAMPLE 14

Preparation of an SMC

A resin/filler mixture was prepared from the following components using a high-speed stirrer:
- 85.0 parts of UP resin 1
- 15.0 parts of diamine 1
- 5.5 parts of zeolite powder (Baylith L)
- 5.0 parts of zinc stearate
- 165.0 parts of filler chalk (Millicarb)
- 1.5 parts of tert.-butyl perbenzoate A solution of 5.5 parts of 4,4'-diphenylmethane diisocyanate (1) in 5 parts of styrene was added to this mixture, likewise with stirring, the mixture was deaerated for about 4 minutes in a water-pump vacuum, and two glass fiber mats (40×40 cm, continuous fibers bound in a styrene-soluble manner) were impregnated between polyester films. After storing for 24 hours at 23° C., a tack-free, leather-like semi-finished product was produced; this was press-molded in a polished steel mold at 140° C. in 12 minutes under a pressure of 200 bar to form a tile (4×120×120 mm). The molding had a glossy surface. The glass fiber content was 9%.

EXAMPLE 15

A mixture was prepared from the following components:
- 175.0 parts of UP resin 1
- 50.0 parts of diamine 1
- 25.0 parts of styrene
- 29.5 parts of isocyanate 1, dissolved in 25 parts of styrene
- 4.5 parts of benzoyl peroxide (50%)
- 1.5 parts of tert.-butyl perbenzoate This mixture was poured into a cold metal sheet mold (4×200×200 mm) and stored for 21 hours, during which time the viscosity (23° C.) increased to $6.65 \times 10^6$ mPa.s. Curing was effected by placing the mold in an oven at 120° C. (2.5 hours); after cooling and demolding, a hard, transparent tile was obtained which gave an impact strength of 21 kJ/m² in the flexural impact test (DIN 53453).

EXAMPLES 16 TO 19

The thickening of monomers and resin solutions without filler was investigated. The results are collated in Table 2.

TABLE 2

| Component (parts) | Example 16 | Example 17 | Example 18 | Example 19 |
|---|---|---|---|---|
| Amine 1 | 20 | 20 | 20 | — |
| Amine 4 | — | — | — | 21 |
| Epikote 828 | — | 56 | — | — |
| Diallyl phthalate | 80 | — | — | 79 |
| Styrene | — | 24 | — | — |
| Methyl methacrylate | — | — | 80 | — |
| Isocyanate 1 | 3.92 | 3.92 | 3.92 | — |
| Isocyanate 2 | — | — | — | 6.38 |
| Consistency after 7 days | solid, hard, opaque, sol. in DMF | solid, hard, opaque, sol. in DMF | solid, tough, opaque | very hard, slightly cloudy |

EXAMPLES 20 TO 24

The thickening of UP resin solutions and high polymer solutions containing filler was investigated. The results are collated in Table 3.

TABLE 3

| Component (parts) | Example 20 | Example 21 | Example 22 | Example 23 | Example 24 |
|---|---|---|---|---|---|
| UP resin 4 | 62 | 47 | 47 | — | — |
| UP resin 5 | — | — | — | 70 | — |
| Amine 1 | — | — | — | 20 | 20 |
| Amine 4 | 10.5 | 21 | 21 | — | — |
| Poly(vinyl) acetate | — | — | — | — | 24.5 |
| Diallylphthalate | 28.5 | 33 | 33 | — | — |
| Styrene | — | — | — | 10 | 55.5 |
| Isocyanate 1 | 2.8 | 5.9 | — | — | 3.9 |
| Isocyanate 3 | — | — | 5.9 | 3.9 | — |
| Millicarb | 150 | 150 | 150 | 150 | 150 |
| Viscosity (23° C.) ×$10^{10}$ 6 mPa.s | | | | | |
| 1 hour | 36 | 176 | 76 | 84 | 100 |
| 24 hours | 68 | 384 | 112 | 140 | 204 |

EXAMPLES 25 and 26

Thickening of vinyl ester resins

TABLE 4

| Component (parts) | Example 25 | Example 26 |
|---|---|---|
| VE resin 1 | 100 | — |
| VE resin 2 | — | 100 |
| Amine 4 | 25 | 25 |
| Isocyanate 1 | 32 | 6 |
| Styrene | 32 | 6 |
| Viscosity at 23° C. (mPa.s) | | |
| after 24 hours | $1.2 \times 10^6$ | $10 \times 10^6$ |
| after 48 hours | dry | dry stiff |

EXAMPLE 27

A resin/filler mixture was prepared from the following components using a high-speed stirrer.
- 100.0 parts of VE resin 2
- 15.0 parts of amine 4
- 6.1 parts of zeolite powder (Baylith L, Bayer)
- 5.5 parts of zinc stearate
- 184.0 parts of filler chalk (Millicarb)
- 2.5 parts of tert.-butyl perbenzoate A solution of 22 parts of isocyanate 1 in 22 parts of styrene was added to this mixture with stirring. A glass fiber mat (40×40 cm, continuous fibers bound in a styrene-soluble manner) was impregnated between two polyester films using the mixture thus prepared. After a storage time of 24 hours at 23° C., a tack-free, leather-like semi-finished product was produced; this was press-molded in a polished steel mold at 140° C. for 10 minutes under a pressure of 200 bar to form a tile (4×120×120 mm).

EXAMPLE 28

70 parts of UP resin 1
10 parts of styrene
5 parts of filler zeolite
150 parts of filler chalk were homogenized with stirring, and 5.8 parts of isocyanate 1 were then stirred in. After 10 minutes, 10 parts of amine 1 were added.

After 24 hours, a viscosity (at 23° C.) of $43 \times 10^6$ [mPa.s] was measured. The resin in the thickened sample was still soluble in DMF.

We claim:

1. A thickened, uncrosslinked molding composition which has a long shelf life at 23° C. and can be cured at above 50° C. and contains A a liquid reactive system which can be polymerized by means of free radicals, B 1 to 80% by weight, based on A, of an isocyanate-containing thickener, C 0.01 to 5% by weight, based on A, of a polymerization initiator which decomposes at above 50° C., and, if desired, D an additive selected from the group consisting of reinforcing fibers, fillers, polymerization inhibitors, polyfunctional hydroxyl compounds, lubricants, paraffins, flame retardants, metal oxides, thickening accelerators, curing accelerators and mixtures thereof, wherein the thickener is a combination of B1 0.001 to 0.5 amine equivalent based on 100 g of A+B1, of an aminobenzoic acid derivative, and B2 0.001 to 1.5 isocyanate equivalents, based on one equivalent of all the NCO-reactive groups present in the molding composition, of an isocyanate.

2. A thickened molding composition as claimed in claim 1, wherein an aminobenzoic acid derivative of the formula (I) is employed:

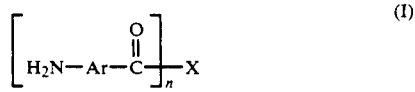

(I)

where the symbols have the following meaning:

Ar is divalent, substituted or unsubstituted aromatic radical;

n is 1 or 2;

X is —O—R¹, —NH—R¹, —N(R¹)₂, —O—R—O, —NH—R—NH—, —NH—R—O,

—NH—R—N—, —N—R—N— or —N—R—O—;
　　　　|　　　　|　　|　　　　|
　　　　R¹　　　R¹　R¹　　　　R¹

R is polyether, polyester, polyamide or polycarbonate group; and

R¹ is alkyl or aryl.

3. A thickened molding composition as claimed in claim 2, wherein X is —O—R—O— or —NH—R—NH—, and R is a polyether group having a degree of polymerization of from 1 to 300 or an alkylene group having 2 to 20 carbon atoms.

4. A thickened molding composition as claimed in claim 1, wherein component A is a monomer A1 which can be polymerized by means of free radicals.

5. A thickened molding composition as claimed in claim 1, wherein component A is a mixture of A1 not less than 5% by weight of a monomer which can be polymerized by means of free radicals and A2 a maximum of 95% by weight of a saturated or unsaturated oligomer or polymer which is dissolved or dispersed in A1.

6. A thickened molding composition as claimed in claim 5, wherein component A2 is an unsaturated polyester, a vinyl ester, a vinyl ester urethane, an allylated prepolymer, a bismaleimide resin or a hydrocarbon resin.

7. A thickened molding composition as claimed in claim 5, wherein component A2 is a saturated polyester, a polyester polyol, a polyether polyol, an epoxy resin, a thermoplastic or an elastomer.

8. A thickened molding composition as claimed in claim 1, containing 0 to 400%, by weight, based on A, of fibrous reinforcing materials as the additive.

9. A thickened molding composition as claimed in claim 1, containing 5 to 300% by weight, based on A, of pulverulent or granular fillers as the additive.

10. A thickened molding composition as claimed in claim 1, which has a viscosity of not less than 500,000 mPa.s at 23° C., measured with 150 parts of calcium carbonate as a filter D per 100 parts of A+B.

11. A thickened, uncrosslinked molding composition as claimed in claim 1, which is soluble in an organic solvent selected from the group consisting of dimethylformamide, dimethylsulfoxide and acetone, determined without fillers and reinforcing fibers.

12. A thickened, uncrosslinked molding composition as claimed in claim 1, which has a long shelf life and is still at least 90% soluble in an organic solvent selected from the group consisting of dimethylformamide, dimethylsulfoxide and acetone, after storage for not less than one day at 23° C.

13. A process for the production of a molding composition as claimed in claim 1, which comprises mixing components A, B1, C and D, adding component B2 at less than 50° C. and thereby initiating thickening.

14. A process for the production of a molding composition as claimed in claim 1, which comprises mixing components A, B2, C and D, adding component B1 at less than 50° C. and thereby initiating thickening.

15. A thickened, uncrosslinked molding composition which has a long shelf life at 23° C. and can be cured at above 50° C. and contains;

A) A liquid reactive system which is a combination of an unsaturated polyester and styrene monomer polymerizable by a means of free radicals, B) 1 to 8 percent by weight, based on A, of a thickener which is a combination of 0.001 to 0.5 amine equivalent, based on 100 g combined weight of said liquid reactive system and amine, of the diamine prepared from diethylene glycol and aminobenzoic acid, and 0.001 to 1.5 isocyanate equivalents, based on one equivalent of all the NCO-reactive groups present in the molding composition, of 4,4-diphenylmethane diisocyanate, C) 0.01 to 5 percent by weight, based on A, of a polymerization initiator which decomposes at a temperature above 50° C., and optionally, D) an additive selected from the group consisting of reinforcing fibers, fillers, polymerization inhibitors, polyfunctional hydroxyl compounds lubricants, paraffins, flame retardants, metal oxides, thickening accelerators and curing accelerators.

16. The process for the production of a molding composition as claimed in claim 13, wherein the still free-flowing composition is applied to reinforcing fibers.

17. The process for the production of a molding composition as claimed in claim 13, wherein the thickening is completed by warming.

18. The process for the production of a molding composition as claimed in claim 14, wherein the still free-flowing composition is applied to reinforcing fibers.

19. The process for the production of a molding composition as claimed in claim 14, wherein the thickening is completed by warming.

* * * * *